Aug. 22, 1933.  A. RÖBIG  1,923,232
BALL JOINT FOR GAUGE RODS AND STEERING RODS ON MOTOR VEHICLES
Filed Feb. 2, 1932
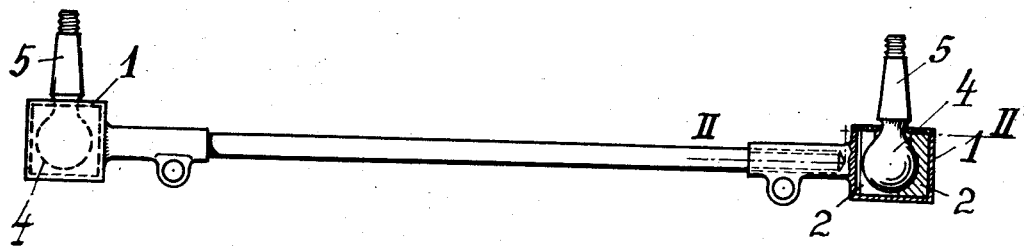
Fig. 1.
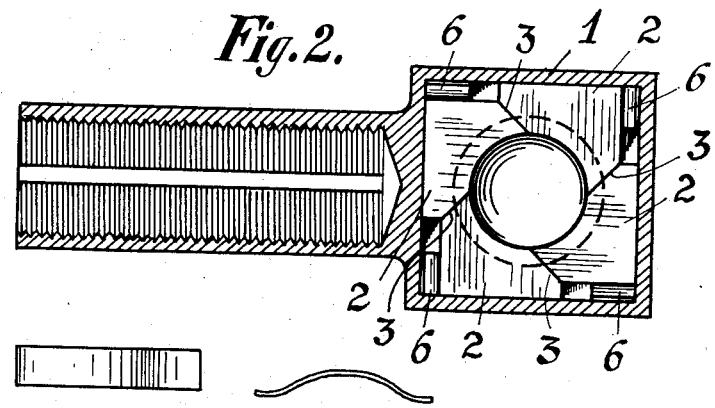
Fig. 2.
Fig. 4.   Fig. 3.

Patented Aug. 22, 1933

1,923,232

UNITED STATES PATENT OFFICE 1,923,232

BALL JOINT FOR GAUGE RODS AND STEERING RODS ON MOTOR VEHICLES

Adolf Röbig, Frankfort-on-the-Main-Nied, Germany

Application February 2, 1932, Serial No. 590,403, and in Germany October 14, 1931

3 Claims. (Cl. 287—90)

This invention relates to a ball joint, as used especially for gauge rods and steering rods of motor vehicles. If a car has to run perfectly, these ball joints must not have any lost motion, so that it is important to prevent as far as possible clearance between ball pin and ball cups. Care has therefore to be taken, that the cups readjust themselves automatically.

With this object in view it has been proposed to allow shifting of the cups by jerks and pressures occurring during the running, the cups being held together merely by springs. Constructions are further known, in which wedge-shaped cups are pressed by springs between ball pin and the circular housing. In such construction exists however the danger that, owing to the circular housing, a wedge-shaped cup may wedge between the ball pin and the housing when the ball pin is turning. According to the invention the ball cups form around the ball a completely closed body shiftable in itself, the shifting of the cups taking place between bevelled faces and so that between these faces, when shifting occurs, no interval can be produced. The ball cups block one another against yielding under ball pressures.

An embodiment of the invention is diagrammatically illustrated by way of example in the accompanying drawing in which:—

Fig. 1 shows in elevation a complete gauge rod.

Fig. 2 shows the arrangement of the ball cups in a section on line II—II of Fig. 1.

Fig. 3 shows a pressure spring in top plan view.

Fig. 4 is a side elevation of Fig. 3.

The housing 1 is of square shape, and in the same four ball cups 2 are mounted which mutually support one another by bevelled faces 3. In the cups the ball 4 with the ball pin 5 is located. Flat pressure springs 6 are inserted in the intervals between the ball cups 2 and the housing 1. The pressure of these springs has the tendency to continually reduce in size the ball bed, the prejudicial wedge effect existing in the known constructions being however avoided as the housing 1 is square. The pressures exerted by the ball pin during the running of the car are not taken up by the spring but by the wall of the housing. It is impossible that the cups give way as they lock one another by means of the bevelled faces 3. These faces 3 must be inclined at a suitable angle to ensure a perfect locking also when the cups 2 are much displaced. The housing 1 is closed at the top and at the bottom by cover plates, one of these plates having a bore serving as passage for the ball pin 5.

I claim:—

1. In a ball joint, a housing having a polygonal aperture, a ball therein, a ball cup formed of sections shiftably arranged in said aperture, each section engaged with a face of the aperture and said ball cup sections having sliding engagement with each other and forming a closed bearing surrounding said ball irrespective of the relative movements of the ball in the housing.

2. A ball joint as specified in claim 1 in which the engagement between the ball cup sections is on lines substantially tangential to the ball engaging faces of the ball cup sections.

3. A ball joint as specified in claim 1, in which pressure springs are inserted between the ball cup sections and housing to maintain the sections engaged with the ball.

ADOLF RÖBIG.